(12) United States Patent
Osswald et al.

(10) Patent No.: US 10,205,336 B2
(45) Date of Patent: Feb. 12, 2019

(54) SWITCHED-MODE POWER SUPPLY HAVING AT LEAST ONE POWER CIRCUIT AND AT LEAST ONE AUXILIARY POWER SUPPLY UNIT

(71) Applicant: Robert Bosch GmbH, Stuttgart (DE)

(72) Inventors: Alexander Osswald, Stuttgart (DE); Marc-Alexandre Seibert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 202 days.

(21) Appl. No.: 14/870,753

(22) Filed: Sep. 30, 2015

(65) Prior Publication Data
US 2016/0094062 A1 Mar. 31, 2016

(30) Foreign Application Priority Data
Sep. 30, 2014 (DE) .................. 10 2014 219 787

(51) Int. Cl.
*H02J 7/04* (2006.01)
*H02J 7/16* (2006.01)
*H02J 7/02* (2016.01)
*H02M 3/335* (2006.01)

(52) U.S. Cl.
CPC ......... *H02J 7/022* (2013.01); *H02M 3/33561* (2013.01)

(58) Field of Classification Search
CPC .................. H02M 3/33561; H02J 7/022

USPC .................................................. 320/107, 140
See application file for complete search history.

(56) References Cited

U.S. PATENT DOCUMENTS

| | | | | |
|---|---|---|---|---|
| 2008/0116851 A1* | 5/2008 | Mori | ................ | H01M 2/34 320/134 |
| 2008/0174276 A1* | 7/2008 | Takahashi | ............... | H02J 9/061 320/128 |
| 2011/0051463 A1* | 3/2011 | Chen | ................. | H02M 3/33507 363/19 |
| 2012/0194131 A1* | 8/2012 | Osswald | ........... | H02M 3/33523 320/112 |
| 2013/0077363 A1* | 3/2013 | Shen | .................. | H05B 33/0815 363/78 |

FOREIGN PATENT DOCUMENTS

DE       102005022761       2/2006

* cited by examiner

*Primary Examiner* — Zixuan Zhou
(74) *Attorney, Agent, or Firm* — Norton Rose Fulbright US LLP; Gerard Messina

(57) ABSTRACT

A switched-mode power supply is provided which has at least one power circuit for supplying a first electrical consumer, and at least one auxiliary power supply unit for generating a first transformer-coupled output voltage for a switching controller for controlling or regulating the power circuit, and at least one further transformer-coupled output voltage for at least one further electrical consumer in a first operating mode. The first and the at least one further transformer-coupled output voltage of the at least one auxiliary power supply unit are variable in comparison with the first operating mode in a further operating mode of the switched-mode power supply.

17 Claims, 2 Drawing Sheets

SWITCHED-MODE POWER SUPPLY HAVING AT LEAST ONE POWER CIRCUIT AND AT LEAST ONE AUXILIARY POWER SUPPLY UNIT

FIELD OF THE INVENTION

The present invention relates to a switched-mode power supply having at least one power circuit for supplying a first electrical consumer, and at least one auxiliary mains power supply unit for generating a first transformer-coupled output voltage for a switching controller for controlling or regulating the power circuit; in addition, it has at least one further transformer-coupled output voltage for at least one further electrical consumer in a first operating mode. The present invention also relates to a charging device having such a switched-mode power supply.

BACKGROUND INFORMATION

In addition to a large power circuit, it is known to use a small auxiliary power supply unit in a switched-mode power supply, especially for a charging device; the auxiliary power supply unit generates multiple output voltages in order to supply various switching circuits or switching controllers for controlling or regulating the power circuit and possibly additional consumers. For example, such switching circuits or consumers can be a primary-side switching controller or a microprocessor on the secondary side of a switched-mode power supply transformer.

To satisfy energy savings standards, it is necessary for the switched-mode power supply to operate at a considerably reduced power in a further operating mode, for instance an energy-saving or standby operation, in comparison with a first operating mode, e.g., a regular or normal operation. To do so, the power circuit of the switched-mode power supply can be switched off. This is currently accomplished with the aid of a switching circuit logic, which separates the individual output voltages of the auxiliary power supply unit from the switching circuits or switching controllers.

SUMMARY

According to the present invention, in a further operating mode of the switched-mode power supply the first and the at least one further transformer-coupled output voltage of the at least one auxiliary power supply unit is variable in comparison with the first operating mode. Compared to the related art, this provides the advantage that in order to comply with energy savings standards, in particular, no further switching elements are required between the output voltages and the electrical consumers that are connected, so that all switching elements normally required for separating the electrical consumers from the output voltages may be omitted. In the case of potentially-separated output voltages, the optocouplers or transmitters normally necessary may therefore be dispensed with, which results not only in considerable cost savings but also reduces the size of the switched-mode power supply. Another advantage of the present invention is the possibility of a redundant disconnection of the power circuit, since the transformer-coupled output voltages are variable independently of a cut-off relay which is provided anyway.

In one further refinement according to the present invention, in the further operating mode the at least one further output voltage is able to be reduced in comparison with the first operating mode in such a way that the power consumption of the at least one power circuit and/or the first electrical consumer is reduced. As an alternative or in addition, it may be provided that the at least one power circuit and/or the first electrical consumer are/is disconnected. An especially uncomplicated disconnection of the power circuit may be realized in this manner.

The disconnection of the power circuit can be accomplished very safely and easily if the switching controller and/or the first electrical consumer are/is provided with an undervoltage-disconnection function.

The switch between the first and the at least one further operating mode takes place in an especially uncomplicated and cost-saving manner with the aid of a voltage divider, which is connected to the at least one further output voltage, such that a resulting actual voltage at the node of the voltage divider influences a downstream control loop for actuating a power switch on the primary side, which is acting on an input voltage of the auxiliary power supply unit. To do so, a microprocessor modifies the divider ratio of the voltage divider for the switchover from the at least one further operating mode to the first operating mode by switching a resistance in parallel with a low-side resistance of the voltage divider. Conversely, the switch from the first to the further operating mode is realized by separating the parallel connection of the resistances with the aid of a switch which is controlled by the microprocessor.

To ensure a fault-free and long-lasting operation of the switched-mode power supply, a voltage control circuit controls the at least one further output voltage of the auxiliary power supply unit to a constant output voltage for the supply of the microprocessor.

In the further operating mode, the auxiliary power supply unit moreover reduces the at least one further output voltage in comparison with the first operating mode in such a way that the at least one further electrical consumer is operating at a reduced power consumption. However, as an alternative or in addition, an increase in the at least one further output voltage in comparison with the first operating mode may be provided as well in the further operating mode, so that the at least one further electrical consumer is able to operate at a higher power consumption. In an especially advantageous manner, the at least one further electrical consumer may be an illumination means, in particular a light diode or a lamp, which has a lower brightness or intensity at the reduced power consumption in the further operating mode, or which has a greater brightness or intensity at the higher power consumption in comparison with the first operating mode. It is therefore possible to directly indicate the different operating modes as a function of the further transformer-coupled output voltage.

The switched-mode power supply is advantageously designed so that the at least one further output voltage supplies a greater output power than the at least one first output voltage. Greater control accuracy of the switched-mode power supply can be achieved in this manner.

In addition, a charging device having the switched-mode power supply according to the present invention is provided, the at least one first electrical consumer being a rechargeable battery pack that is to be charged by the power circuit of the charging device. The switched-mode power supply of the present invention is able to be used in a particularly advantageous manner especially in a charging device, since the legal requirements regarding a safe disconnection and/or the maximum consumption values in the energy or standby mode are particularly high.

Additional advantages of the present invention result from the features indicated in the dependent claims as well as from the drawing and the following description.

DETAILED DESCRIPTION

Figure 1:
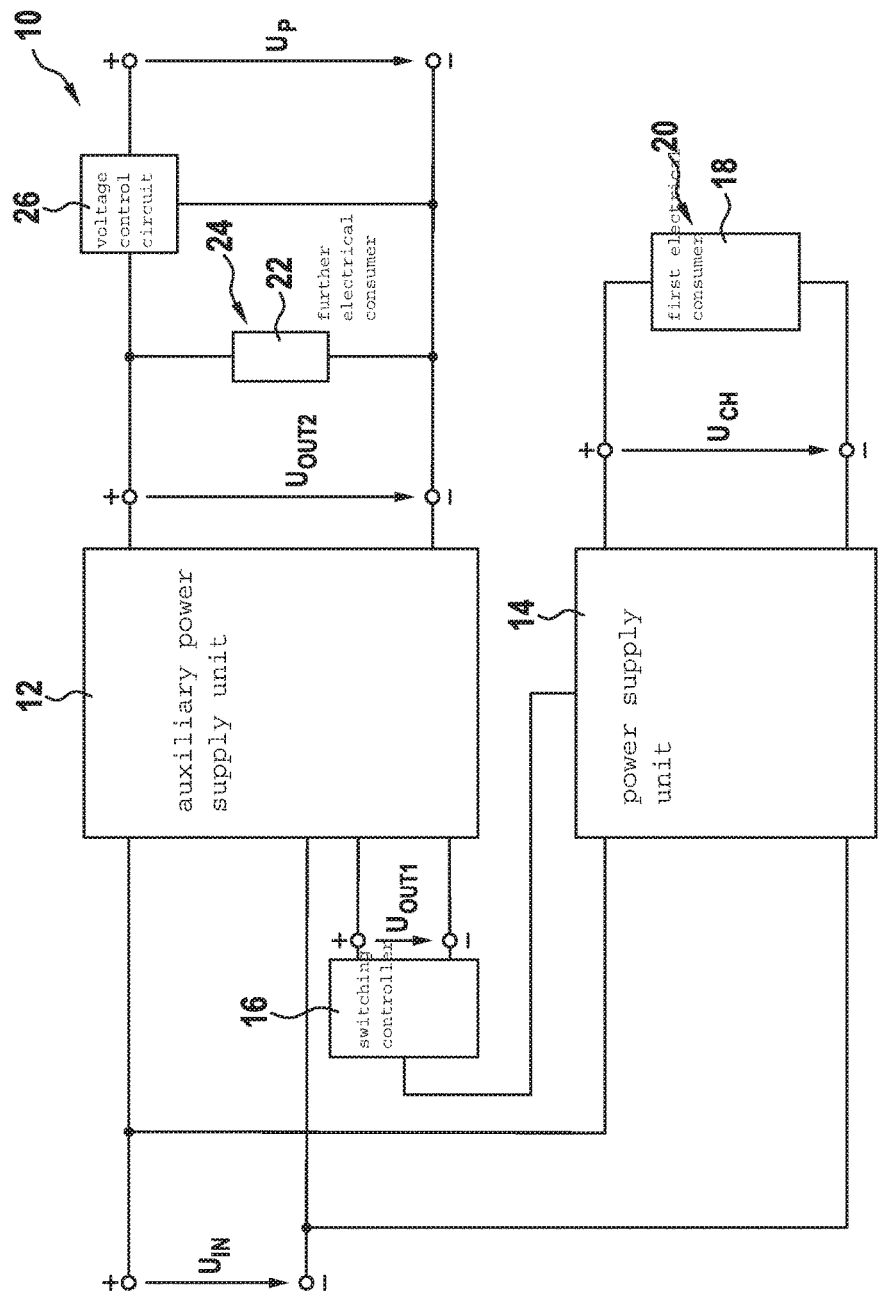
FIG. 1 shows a block diagram of the switched-mode power supply according to the present invention, in a first overall view.

FIG. 1 shows a block diagram of a switched-mode power supply 10 according to the present invention for a charging device, which is not shown in greater detail. One skilled in the art of automatic control engineering and microelectronics is familiar with the structure of a charging device provided with a switched-mode power supply according to the definition of the species in claim 1, so that no further discussion of this topic will be undertaken.

Switched-mode power supply 10 according to the present invention may also be used in other power supply units in which a power circuit is to be disconnected in a safe and energy-saving manner with the aid of an auxiliary power supply unit. For example, it is readily conceivable to use the switched-mode power supply of the present invention in a power supply unit for a computer, a monitor, an entertainment device or a similar apparatus.

Switched-mode power supply 10 is supplied via a rectified input voltage $U_{IN}$. The rectification of input voltage $U_{IN}$ is not explicitly shown in FIG. 1. It can be generated in the known manner from an AC voltage, e.g., a system voltage, with the aid of a Graetz bridge and a downstream electrolytic capacitor for smoothing. However, the type of rectification is of no importance for the invention.

Figure 2:
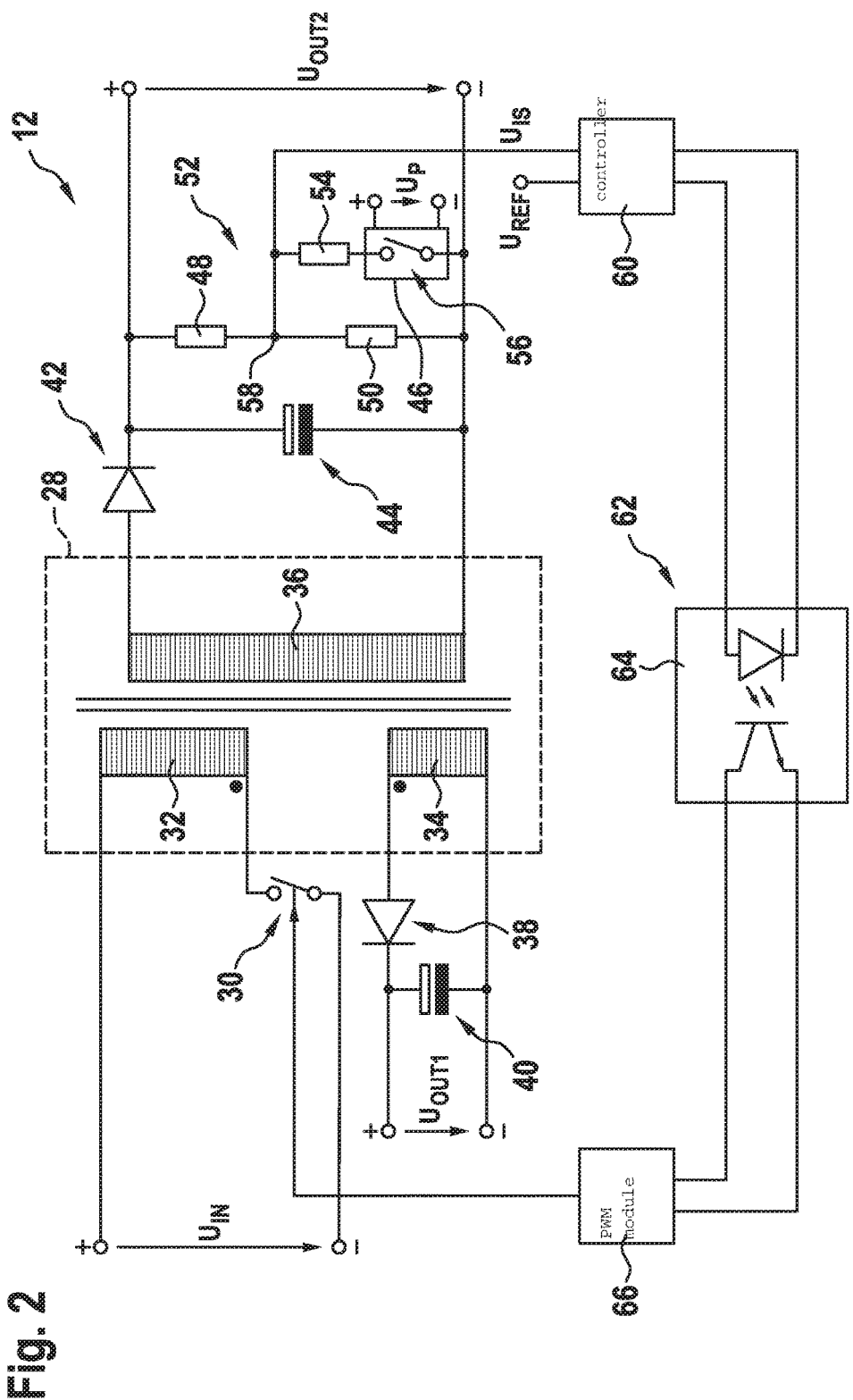
FIG. 2 shows a schematic view of the auxiliary power supply unit included in the switching-mode power supply according to the present invention.

Among other things, rectified and smoothed input voltage $U_{IN}$ is used within switched-mode power supply 10 for the supply of an auxiliary power supply unit 12, which will be addressed in greater detail in FIG. 2, and a power supply unit 14. Auxiliary power supply unit 12 supplies a first transformer-coupled output voltage $U_{OUT1}$ for a switching controller 16. Switching controller 16 controls or regulates power circuit 14, which in turn is used for supplying a first electrical consumer 18. In the event that switched-mode power supply 10 is part of a charging device, first electrical consumer 18 may be developed as a rechargeable battery pack 20 made up of at least one battery cell. However, it is also conceivable that first electrical consumer 18 is an electric circuit of a computer, monitor, entertainment device or the like.

In addition, auxiliary power supply unit 12 delivers at least one further transformer-coupled output voltage $U_{OUT2}$, which supplies a further electrical consumer 22; such an electrical consumer may be developed in the form of, for example, an illumination means 24, especially an LED, lamp or the like. A voltage control circuit 26 controls the at least one further output voltage $U_{OUT2}$ to a constant output voltage $U_P$, which is always lower than the at least one further output voltage $U_{OUT2}$. All output voltages $U_{OUT1}$, $U_{OUT2}$ and $U_P$ are DC voltages having a higher supply potential + in comparison with a reference potential −. In addition, in order to achieve better control accuracy, the at least one further output voltage $U_{OUT2}$ has a higher output power than first output voltage $U_{OUT1}$.

The switch of switched-mode power supply 10 from a first operating mode to a further operating mode will now be described with the aid of FIG. 2. The first operating mode may be a normal charging operation of the charging device, while the further operating mode is an energy-saving or standby mode having lower energy consumption in comparison with the operating mode.

With the aid of a transformer 28 of auxiliary power supply unit 12, input voltage $U_{IN}$ is converted into first transformer-coupled output voltage $U_{OUT1}$ and into the at least one further transformer-coupled output voltage $U_{OUT2}$. A power switch 30 is used for clocking a primary winding 32 of transformer 28, such that the energy of the pulsed voltage is transmitted to a first secondary winding 34 and a second secondary winding 36 within transformer 28. With the aid of a diode 38 and an electrolytic capacitor 40, first output voltage $U_{OUT1}$ is rectified and smoothed for the supply of switching controller 16 shown in FIG. 1. The latter controls power supply unit 14 according to the above description in order to charge first electrical consumer 18, which is developed as a rechargeable battery pack 20.

Further output voltage $U_{OUT2}$ supplied via second secondary winding 36 is rectified and smoothed with the aid of another diode 42 and a further electrolytic capacitor 44.

Using a microprocessor 46, it is now possible to switch between the normal operating mode (e.g., a charge operation) and the further operating mode (e.g., a standby or energy-saving mode). For this purpose a voltage divider 52, made up of at least one high side resistance 48 and one low side resistance 50, is interconnected between the − reference potential and the + operating potential of further output voltage $U_{OUT2}$; its divider ratio is variable with the aid of a resistance 54 which is switchable in parallel with low side resistance 50. During the normal operating mode resistance 54 is switched in parallel with low side resistance 50 with the aid of a switch 56 controlled by microprocessor 46, so that the at least one additional output voltage $U_{OUT2}$ has a value of 12V, for instance, and first output voltage $U_{OUT1}$ has a value of 9V, for example. Picked off at node 58 of voltage divider 52 is an actual voltage $U_{IS}$, which is compared to a reference voltage $U_{REF}$ within a controller 60. The controller is part of a control loop 62, developed as a reverse converter topology, which clocks power switch 30 via an optocoupler 64 for the galvanic separation, and a PMW module 66, such that rechargeable battery pack 20 is charged in the desired manner with the aid of first output voltage $U_{OUT1}$ that controls switching controller 16. The method of functioning of such a control loop 62 within a charging device is known to one skilled in the art and will therefore not be described in greater detail here.

A switchover into the standby mode now takes place in that microprocessor 46 opens switch 56, so that resistance 54 is no longer switched in parallel with low side resistance 50. This causes actual voltage $U_{IS}$ to rise, to the effect that controller 60 controls PWM module 66 in such a way that it clocks power switch 30 at a reduced duty cycle. As a result, both the first transformer-coupled output voltage $U_{OUT1}$ is reduced to approximately 4V, for example, and the at least one further transformer-coupled output voltage $U_{OUT2}$ is reduced to approximately 6V. If switching controller 16 and/or rechargeable battery pack 30 have/has an integrated undervoltage switchoff function, then reduced first output voltage $U_{OUT1}$ leads directly to the disconnection of power circuit 14 and/or rechargeable battery pack 20, while further electrical consumer 22 is operated at an energy consumption that is lower than in the normal operating mode. If further electrical consumer 22 is developed as an illumination means 24, then it is possible to directly display the standby operation of the charging device in this manner, since illumination means 24 now shines at a reduced intensity or brightness.

While transformer-coupled output voltages $U_{OUT1}$ and $U_{OUT2}$ follow this control process, output voltage $U_P$ controlled by voltage control circuit 26 remains constant at 3V, for example, in order to ensure a permanent operation of microprocessor 46.

A disconnection of power circuit 14 and/or first electrical consumer 18 or compliance with energy savings standards consequently requires no further switching elements between the transformer-coupled output voltages and the electrical consumers connected thereto, so that all components that are normally required for separating the electrical consumers from the output voltages may be omitted. In the case of potentially-separated output voltages, the normally necessary optocouplers or transmitters may be dispensed with in this way, which results in considerable cost savings and also reduces the size of the switched-mode power supply.

In addition, it is also possible to increase transformer-coupled output voltages $U_{OUT1}$ and $U_{OUT2}$ and possibly additional transformer-coupled output voltages of auxiliary power supply unit 12 in a further operating mode in comparison with the first operating mode, the switchover between the operating modes taking place in the aforedescribed manner via microprocessor 46 and voltage divider 52 having a correspondingly configured resistance 54. Because of the increase in further output voltage $U_{OUT2}$, it is then possible, for example, the operate illumination means 24 directly at a greater intensity or brightness in comparison with the first operating mode, in order to thereby indicate the further operating mode. For instance, an increase in transformer-coupled output voltages $U_{OUT1}$ and $U_{OUT2}$ may be required when first electrical consumer 18, developed as battery pack 20, is to be charged especially rapidly in comparison with the normal operation of the charging device.

To achieve a switchover between more than two operating modes, it is also possible to switch multiple, differently configured resistances 54 in parallel with low side resistance 50 via switches 56, which are switched in series accordingly. It is furthermore pointed out that the present invention is not restricted to the mentioned voltage values. They are merely given as examples. The described operation for a charging device is likewise not to be interpreted in a restrictive sense. The present invention can readily be used for switched-mode power supplies in computers, monitors, entertainment devices or the like, in which a reliable disconnection of the mains power supply is desired or required.

What is claimed is:

1. A switched-mode power supply, comprising:
    at least one power circuit for supplying a first electrical consumer device; and
    at least one auxiliary power supply unit for generating a first transformer-coupled output voltage for a switching controller for one of controlling and regulating the power circuit, and at least one further transformer-coupled output voltage for at least one further electrical consumer device;
    a voltage divider which receives the at least one further transformer-coupled output voltage and, in a first operating mode, supplies a first output voltage to the at least one further electrical consumer device, and in a further operating mode, supplies a second output voltage to the at least one further electrical consumer device, the first output voltage being different from the second output voltage; and
    a microprocessor for varying a divider ratio of the voltage divider for a switchover from the at least one further operating mode to the first operating mode by switching a resistance in parallel with a low-side resistance of the voltage divider;
    wherein the first electrical consumer device is a rechargeable battery pack, and the at least one further electrical consumer device is an illumination unit;
    wherein the second output voltage in the further operating mode is lower in comparison with the first output voltage in the first operating mode in such a way that the illumination unit operates at a reduced power consumption during the further operating mode as compared to operation during the first operating mode; and
    wherein in the further operating mode, the illumination unit has one of a lower brightness and a lower intensity at the reduced power consumption in comparison with the first operating mode.

2. The switched-mode power supply as recited in claim 1, wherein the second output voltage is lower in comparison with the first output voltage in such a way that a power consumption of at least one of the at least one power circuit and the first electrical consumer device is reduced in the further operating mode as compared to the first operating mode.

3. The switched-mode power supply as recited in claim 1, wherein the second output voltage is lower in comparison with the first output voltage in such a way that at least one of the at least one power circuit and the first electrical consumer device is switched off.

4. The switched-mode power supply as recited in claim 3, wherein at least one of the switching controller and the first electrical consumer device has an undervoltage-switchoff function.

5. The switched-mode power supply as recited in claim 1, wherein the voltage divider is connected to the at least one further output voltage in such a way that a resulting actual voltage at a node of the voltage divider influences a downstream control loop for actuating a power switch on a primary side of a transformer of the auxiliary power supply unit which is acting on an input voltage of the auxiliary power supply unit.

6. The switched-mode power supply as recited in claim 1, further comprising:
    a voltage control circuit for controlling the at least one further output voltage of the auxiliary power supply unit to a constant output voltage for a supply of the microprocessor.

7. The switched-mode power supply as recited in claim 1, wherein the illumination unit includes one of a light diode and a lamp.

8. The switched-mode power supply as recited in claim 1, wherein the auxiliary power supply unit has a reverse converter topology.

9. The switched-mode power supply as recited in claim 1, wherein both the first output voltage and the second output voltage are greater than 0 volts.

10. The switched-mode power supply as recited in claim 1, wherein the illumination unit is connected in parallel to the voltage divider.

11. A charging device, comprising:
a switched-mode power supply that includes:
- at least one power circuit for supplying a first electrical consumer device; and
- at least one auxiliary power supply unit for generating a first transformer-coupled output voltage for a switching controller for one of controlling and regulating the power circuit, and at least one further transformer-coupled output voltage for at least one further electrical consumer device in a first operating mode;
- a voltage divider which receives the at least one further transformer-coupled output voltage and, in a first operating mode, supplies a first output voltage to the at least one further electrical consumer device, and in a further operating mode, supplies a second output voltage to the at least one further electrical consumer device, the first output voltage being different from the second output voltage; and
- a microprocessor for varying a divider ratio of the voltage divider for a switchover from the at least one further operating mode to the first operating mode by switching a resistance in parallel with a low-side resistance of the voltage divider;
- wherein the first electrical consumer device includes a rechargeable battery pack that is to be charged by the power circuit of the charging device;
- wherein the at least one further electrical consumer device is an illumination unit; and
- wherein the illumination unit is connected in parallel to the voltage divider.

12. The charging device as recited in claim 11, wherein both the first output voltage and the second output voltage are greater than 0 volts.

13. The switched-mode power supply as recited in claim 11, wherein the illumination unit includes one of a light diode and a lamp.

14. A switched-mode power supply, comprising:
- at least one power circuit for supplying a first electrical consumer device; and
- at least one auxiliary power supply unit for generating a first transformer-coupled output voltage for a switching controller for one of controlling and regulating the power circuit, and at least one further transformer-coupled output voltage for at least one further electrical consumer device;
- a voltage divider which receives the at least one further transformer-coupled output voltage and, in a first operating mode, supplies a first output voltage to the at least one further electrical consumer device, and in a further operating mode, supplies a second output voltage to the at least one further electrical consumer device, the first output voltage being different from the second output voltage; and
- a microprocessor for varying a divider ratio of the voltage divider for a switchover from the at least one further operating mode to the first operating mode by switching a resistance in parallel with a low-side resistance of the voltage divider;
- wherein the first electrical consumer device is a rechargeable battery pack, and the at least one further electrical consumer device is an illumination unit;
- wherein the second output voltage in the further operating mode is higher in comparison with the first output voltage in the first operating mode in such a way that the illumination unit operates at a higher power consumption during the further operating mode as compared to operation during the first operating mode; and
- wherein in the further operating mode, the illumination unit has one of a greater brightness and a greater intensity at the reduced power consumption in comparison with the first operating mode.

15. The switched-mode power supply as recited in claim 14, wherein the illumination unit includes one of a light diode and a lamp.

16. The switched-mode power supply as recited in claim 14, wherein the illumination unit is connected is parallel to the voltage divider.

17. The switched-mode power supply as recited in claim 14, wherein both the first output voltage and the second output voltage are greater than 0 volts.

* * * * *